United States Patent Office 3,380,976
Patented Apr. 30, 1968

3,380,976
METHOD OF PRODUCING ACRYLONITRILE POLYMERS IN THE PRESENCE OF A CATALYST COMPRISING OCTANOYL PEROXIDE OR t-BUTYL PEROXYPIVALATE AND USING AS A SOLVENT DIMETHYLSULFOXIDE OR ETHYLENE CARBONATE
Zenzi Izumi and Hideji Kitagawa, Ehime-ken, and Masakatu Shinto, Shiga-ken, Japan, assignors to Toyo Rayon Kabushiki Kaisha, Tokyo, Japan, a corporation of Japan
No Drawing. Filed Oct. 15, 1964, Ser. No. 404,183
Claims priority, application Japan, Oct. 21, 1963, 38/55,877
8 Claims. (Cl. 260—85.5)

ABSTRACT OF THE DISCLOSURE

A method for solution polymerising acrylonitrile, said method being performed under a specific combination of a catalyst and a solvent, characterized in that the solvent is selected from the group consisting of dimethyl sulfoxide and ethylene carbonate and the catalyst is selected from the group consisting of octanoyl peroxide and tert-butyl peroxypivalate.

---

This invention relates to a method of producing acrylonitrile polymers by solution polymerisation.

It has been proposed to produce acrylonitrile polymers by solution polymerisation using as the solvent dimethyl sulphoxide or ethylene carbonate, optionally with a small amount of water or alcohol, and that the product can be used for spinning. It is also known that salts of persulphuric acid, such as ammonium persulphate, or azobis isobutylonitrile can be used as the catalyst in the polymerisation of acrylonitrile. United States specification No. 2,858,290 states that the initiation of the solution polymerisation of acrylonitrile in dimethyl sulphoxide can be done using as the catalyst azobisisobutylonitrile, ammonium persulphate or ultra violet rays, whereas the use of benzoyl peroxide, hydrogen peroxide or 2,4-dichlorobenzoyl peroxide is said to be unsuccessful. On the other hand, United States specification No. 2,858,288 states that in addition to azobis compounds and persulphuric salts, peroxides such as benzoyl peroxide, dichlorobenzoyl peroxide, lauroyl peroxide and cumene peroxide can be used successfully as catalysts for polymerisation in dimethylsulphoxide containing water in an amount of less than 20%, preferably 2 to 15%.

The greatest problem encountered in polymerising acrylonitrile is the discoloration of the product, the azobis compounds being particularly unsatisfactory in this respect.

As can be seen from both the above United States specifications, certain peroxides can be used as polymerisation catalysts for acrylonitrile. However, peroxides are subject to complicated decomposition including inductive decomposition and reaction with solvents, the rate of decomposition depending upon the solvent. The question of whether the peroxide radicals produced can initiate polymerisation, whether said radicals decompose and whether they develop side reactions, depends on the chemical characteristics of the monomers and solvents used. Therefore, even when the solvent and monomer are specified it is impossible to predict whether or not a given type of peroxide can actually act as a polymerisation catalyst. However, we have now found that, even where dimethylsulphoxide is used as solvent, benzoyl peroxide, dichlorobenzoyl peroxide and cumene peroxide are not suitable for industrial use if the temperature used is below 55° C. The only exception is lauroyl peroxide which has usable polymerisation activity, but as shown later in Table 1, even this peroxide is far from satisfactory with respect to the function of accelerating polymerisation and discoloration of the product.

We have found according to the present invention that acrylonitrile can be successfull polymerised using as the solvent dimethyl sulphoxide or ethylene carbonate, and using as the catalyst octanoyl peroxide or t-butylperoxypivalate. Thus the invention provides a method of producing a polymer of acrylonitrile, which comprises subjecting acrylonitrile to solution polymerisation using as the solvent dimethylsulphoxide or ethylene carbonate and as the polymerisation catalyst octanoyl peroxide or t-butylperoxypivalate. This method can be used successfully even where the solvent contains small amounts of water and/or alcohol, and by means of the method of the invention, the abovementioned technical defects of the prior art can be avoided in that polymerisation can be effected to a higher polymerisation degree and in shorter periods of time, and a product remarkably free from discoloration can be obtained. In addition, difficulty with unwanted polymerisation during the recovery of unreacted monomer can be avoided because the catalyst is decomposed in relatively short time.

It is a surprising fact that although such peroxides as benzyl peroxide, hydrogen peroxide and 2,4-dichlorobenzoyl peroxide do not show any catalytic activity where the solvent for the polymerisation is free from water, the catalyst used in the method of the present invention displays excellent activity even in a waterless solvent system.

The method of the present invention is particularly applicable to the production of copolymers of acrylonitrile from mixtures of acrylonitrile and a monomeric vinyl compound copolymerisable therewith, the acrylonitrile comprising at least 85 mol percent of the mixture.

Suitable vinyl compounds copolymerisable with acrylonitrile are, for example, acrylic acid, methacrylic acid, esters of acrylic acid, esters of methacrylic acid, acrylamides, methacrylamides and monoalkyl derivatives thereof; styrene and alpha and beta substitutes and nuclear substitutes thereof; vinyl chloride, vinylidene chloride, vinyl carboxylates (for instance vinyl acetate), vinyl chloroacetate, vinyl benzoate; vinyl pyridines (for instance 2-vinyl pyridine), alkyl derivatives of vinyl pyridines (for instance 2-methyl-5-vinyl pyridine); alkenyl aromatic sulphonates, vinyl sulphonates, allyl sulphonates and methallyl sulphonate, and salts and esters thereof.

The method of the present invention can be carried out using known techniques for the solution polymerisation of acrylonitrile, though it can be conveniently performed at temperatures below 55° C., for example, at the comparatively low temperature of 45° C. It is desirable to conduct said reaction in a complete absence of oxygen (which has harmful effects on polymerisation) using an inert gas such as nitrogen or carbon dioxide to replace air. The method of the invention may be conducted continuously or by a batch cycle.

There can be used in the method of the invention adjuvants, for instance anti-coloring agents and chain-transfer agents. These components may be added all at once prior to the initiation of reaction, or part of them may be charged in the course of the process. The monomer concentration in the solution which is subject to polymerisation depends on the degree of polymerisation and viscosity of the product required.

The amount of catalyst is preferably between 0.003 and 0.05 mol/l. However, the most effective amount is 0.005 to 0.02 mol/l.

The solution polymerisation of acrylonitrile is generally conducted with heating up to the temperatures at which the catalyst is thermally decomposed. The higher the temperature, the more prominent the colouring of the polymerized solution, leading to unsatisfactory results. Consequently the common practice of polymerisation involves the use of azobis-type catalysts along with anti-coloring agents, polymerisation temperatures being restricted to 50 to 55° C. However, using the method of the present invention, polymerisation can be completed at further reduced temperatures and in shorter periods of time, and also a polymerised solution is obtained with remarkably improved whiteness.

Discoloration of the product acrylonitrile polymer can be further avoided by the use of at least one hydroxylamine salt, preferably used in conjunction with sulphuric acid. Suitable hydroxylamine salts are the hydrochloride, sulphate, oxalate, phosphate and acetate. The amount of the hydroxylamine salt to be used is from 0.05 to 5 (preferably 0.5 to 2) grams per litre of reaction system. The amount of sulphuric acid is preferably 0.01 to 1 gram per litre of the reaction system. The hydroxylamine salt or the said salt and sulphuric acid may be incorporated prior to the reaction or in a relatively early stage thereof as incorporated at the end of the reaction period is usually not effective.

The use of peroxy catalysts in the method of the present invention has the following advantage over the conventional process which involves the use of azobis compounds as catalyst. Where required, the peroxides of the present invention can form a redox system with suitable reducing agents. Although redox catalysts are well known to have small initial activating energies and be unsuitable for low temperature polymerisation, the catalyst of the present invention can start up polymerisation even at low temperatures.

The polymerised solution prepared by the method of the present invention and fibres spun therefrom differ in shades of color from those obtained by the conventional process. In other words, the raw solution for spinning and fibres spun therefrom, previously produced by solution polymerisation in dimethyl sulphoxide or ethylene carbonate using azobis compounds as catalyst generally tend to be colored yellowish-green. In contrast, the method of the present invention provides a product substantially free from such discoloration.

The present invention is illustrated by the following Examples.

Examples 1 and 2

In Example 1 acrylonitrile was polymerised for 20 hours at a temperature of 45° C. using dimethyl sulphoxide as solvent and octanoyl peroxide (0.01 mol/l.) as catalyst. The acrylonitrile concentration was 2.0 mol/l. The experiment was repeated using as solvent dimethylsulphoxide containing 5% by weight of water.

In Example 2 the procedure of Example 1 was repeated except that peroxypivalate was used as catalyst. The degree of polymerisation and the color of the products are shown in Table I below.

A number of comparative experiments were carried out to compare the catalytic activity and the discoloration of the polymerised solution obtained using dimethylsulphoxide as solvent and a number of known catalysts for acrylonitrile, viz—azobisisobutylonitrile, ammonium persulphate, lauroyl peroxide, cumene peroxide, benzoyl peroxide and 2,4-dichloro benzoyl peroxide. A second series of comparative experiments was also carried out using as solvent dimethysulphoxide containing 5% by weight of water.

In Table I the Examples and Control experiment marked * indicate the use as solvent of dimethylsulphoxide containing 5% of water.

TABLE I

| | Catalyst | Polymerisation degree (percent) | Color index (CI [1]) of polymerised solution |
|---|---|---|---|
| Example 1 | Octanoyl peroxide | 85 / *86 | 5.8 / *5.2 |
| Example 2 | t.-Butyl peroxypivalate | 91 / *90 | 5.5 / *4.8 |
| Control 1 | Azobisisobutylonitrile | 53 / *52 | 8.5 / *7.0 |
| Control 2 | Lauroyl peroxide | 55 / *57 | 8.0 / *6.7 |
| Control 3 | Ammonium persulphate | 67 / *65 | 19.5 / *17.0 |
| Control 4 | Benzoyl peroxide | Trace / *5.5 | |
| Control 5 | 2,4-dichlorobenzoyl peroxide | 0 / *4 | |
| Control 6 | Cumene peroxide | 0 / *0 | |

[1] $CI = \dfrac{\log T_{425} + \log T_{550} + \log T_{650}}{3}$ where $\log T_i$ = the transmittance at wavelength $i\mu$.

As can be seen from the above Table I, both azobisisobutylonitrile and lauroyl peroxide retard the polymerisation velocity and are very disadvantageous due to low productivity, and ammonium persulphate is completely impracticable in view of the color index of the product. On the other hand, the catalysts of the present invention produce under the same reaction conditions acrylonitrile polymer of excellent physical properties, particularly as regards color, and can be used on an industrial scale with a high yield.

Example 3

Polymerisation was conducted at a temperature of 45° C. for 30 hours, using 19 parts of acrylonitrile, 1 part of methyl acrylate, 0.3 parts of sodium methallyl sulphonate, 0.1 parts of hydroxylamine sulphate (as an anti-coloring agent), 0.05 parts of ethylenediamine tetracetate (as an agent to prevent discoloration by metals), 80 parts of dimethylsulphoxide and 0.2 parts of octanoyl peroxide. The degree of polymerisation obtained was 93%, the intrinsic viscosity ($\eta$) of the polymer was 1.55, and the polymerised solution had a very fine color with a colour index of 2.5.

After being defrothed, said polymerised solution was spun into a 38% aqueous solution of dimethylsulphoxide at 30° C. through a spinneret provided with 7,000 orifices each of 0.08 mm. diameter to form filamentary yarns. The filamentary yarns obtained by elongation, relaxing, water washing and drying in accordance with conventional procedure lost no transparency, but were highly glossy and extremely white. The yarns thus obtained had excellent physical properties including a tenacity of 3.3 g./d., an elongation of 38% and a specific nodular strength of 78%.

Example 4

A mixture consisting of 18.7 parts of acrylonitrile, 1.3 parts of methyl acrylate, 0.4 parts of sodium p-styrene sulphonate, 0.2 parts of t.-butyl peroxypivalate, 0.03 parts of dodecyl mercaptan, 77 parts of ethylene carbonate and 5 parts of water was polymerised at a temperature of 45° C. for 30 hours. In this case the polymerisation degree was 94%, and the polymerised solution had a viscosity of 240 poises at 45° C. and also had a very fine color with a color index of 1.8.

The polymer solution thus obtained was spun into a 20% aqueous solution of ethylene carbonate at 40° C. through a spinneret provided with 7,000 orifices each of 0.08 mm. diameter at a rate of 120 g. per minute to form filamentary yarns. The yarns were transparent while they were in the bath. They were taken up at a rate of 3 m./min. after travelling through the bath for an immersion length of 3 meters. These undrawn filamentary yarns were immediately introduced into a 5% aqueous solution (at 95° C.) of ethylene carbonate and were elongated to 5 times the original length during a 2-meter immersion. Then the yarns were discharged from the second bath at a rate of 15 m./min. Again said yarns were conducted into a 1% aqueous solution (at 98° C.) of ethylene carbonate, where they were relaxed 15% during a 2-meter immersion. The yarns were discharged from the third bath at a rate of 12.5 m./min. While they were travelling through the water at room temperature for 20 minutes any residual ethylene carbonate was completely removed by water-washing. The yarns were dried for 5 minutes in a drier at 100° C. to reduce their moisture content to less than 3%.

The product thus obtained was completely transparent, having a lustrous white appearance. It had excellent physical properties, without any cavities in the cross sectional area, and had a tenacity of 3.3 g./d., an elongation of 34% and a specific nodular strength of 84%. As expressed in the reflection factor at 480 m$\mu$, the whiteness of the fibre was 89%. The fibre also had exceedingly good dyeability, the absorption of 3% methylene blue being 78% in 1 hour at 98° C.

Example 5

Four experiments were carried out at various temperatures using in each instance a 20.1 polymerisation vessel provided with a draft tube through which was charged a mixture of 20 parts of acrylonitrile and 80 parts of dimethylsulphoxide and 0.2 parts of t.-butyl peroxypivalate with thorough stirring. The relationship between the times and temperatures required to attain a polymerisation degree of 90% are shown in Table 2 below.

TABLE 2

| Polymerisation temperature (° C.): | Required polymerisation time (hr.) |
|---|---|
| 35 | 35 |
| 40 | 25 |
| 50 | 12 |
| 55 | 6 |

At temperatures in excess of 55° C., polymerisation proceeded so rapidly that it was necessary to remove heat generated by polymerisation. Moreover, the activating energies for coloring were greater than those for polymerisation and consequently the use of high temperatures in the application of the method of the invention to industrial use is considered undesirable.

Example 6

Polymerisation was carried out at a temperature of 45° C. for 20 hours, using 18 parts of acrylonitrile, 1.5 parts of vinyl acetate, 0.5 parts of methacrylic acid, 0.1 parts of sulphuric acid, 0.01 parts of iso-octyl phosphate, 80 parts of ethylene carbonate, 0.02 parts of dodecyl mercaptan and 0.3 parts of octanoyl peroxide. In this case the polymerisation degree attained was 91%, and the polymerised solution had a very fine color with a color index of 3.3. From this raw solution were produced yarns with excellent physical properties by conventional procedure.

Example 7

Polymerisation was conducted in a carbon dioxide atmosphere at a temperature of 45° C., for 10 hours, using 24 parts of acrylonitrile, 1.2 parts of methyl methacrylate, 0.3 parts of sodium allyl sulphonate, 0.1 parts of hydroxylamine sulphate, 0.05 parts of anhydrous sulphurous acid, 0.02 parts of isooctyl phosphate, 80 parts dimethylsulphoxide, 1 parts of water, 0.15 parts of t.-butyl peroxypivalate and 0.02 parts of dodecyl mercaptan. In this case the polymerisation degree was 70%, and the viscosity of the polymerised solution was 40 poises at 40° C.

Said solution was passed through an evaporator under the conditions of 60° C., 15 mm. Hg and 5 minutes to evaporate unreacted monomers. Upon leaving the evaporator, the polymerised solution had a polymer concentration of 19%, a viscosity of 190 poises at 45° C. and a very fine color with a color index of 1.7. Said polymerised solution was spun into a 70% aqueous solution of dimethylsulphoxide at 30° C. through a spinneret provided with 7,000 orifices each of 0.08 mm. diameter to form filamentary yarns. The yarns were taken up at a rate of 20 m./min. after travelling through the bath for an immersion length of 4 meters. These undrawn yarns were immediately conducted into a 40% aqueous solution (80° C.) of dimethylsulphoxide, where they were elongated to 5 times the original length during a 4-meter immersion. Next said yarns were again introduced into a 1% aqueous solution of dimethylsulphoxide, where they were relaxed 15% during a 2-meter immersion. While they were travelling through the water at room temperature for 10 minutes, the residual dimethylsulphoxide was completely washed out. The product was then dried in a drier at 100° C. for 5 minutes to reduce the moisture to less than 3%. The fibre thus obtained had lost no transparency, and had great lustre and remarkable whiteness. Without any cavities in the cross sectional area, the fibre had excellent physical properties, including a tenacity of 2.9 g./d., an elongation of 30%, and a specific nodular strength of 87%. As expressed in the reflection factor at 400 m$\mu$, the whiteness of the product was surprisingly as high as 73%. The fibre has excellent dyeability, the rate of absorbing 5% methylene blue being 65% under the conditions of 1 hour and 98° C.

What we claim is:

1. A method of producing a polymer containing at least 85% acrylonitrile, which comprising subjecting acrylonitrile to solution polymerisation using as the solvent dimethylsulphoxide or ethylene carbonate and as the polymerisation catalyst a catalytic amount of octanoyl peroxide or t.-butyl peroxypivalate.

2. A method according to claim 1, in which the solution polymerisation is effected in the absence of oxygen.

3. A method according to claim 1, wherein there is used a hydroxylamine salt as a discoloration inhibitor.

4. A method according to claim 3, in which there is used sulphuric acid in conjunction with said hydroxylamine salt.

5. A method according to claim 4, in which said salt is in an amount of 0.05 to 5 grams per litre of the reaction system and said sulphuric acid is in an amount of 0.01 to 1 gram per litre of the reaction system.

6. A method according to claim 3, in which said hydroxylamine salt is a hydrochloride, sulphate, oxalate, phosphate or acetate.

7. A method according to claim 1, in which the acrylonitrile is in admixture with a vinyl compound, the acrylonitrile being present in an amount of at least 85 mol percent.

8. A method according to claim 1 wherein the polymerisation catalyst is used in an amount between 0.003 and 0.05 mol/liter.

References Cited

UNITED STATES PATENTS 3,060,157 10/1962 Goodman et al. ____ 260—85.5

OTHER REFERENCES

Cooper: J. Chem. Soc. (1951), pp. 3106–3113.

JOSEPH L. SCHOFER, *Primary Examiner.*

H. WONG, JR., *Assistant Examiner.*